United States Patent [19]
Rose

[11] Patent Number: 5,476,089
[45] Date of Patent: Dec. 19, 1995

[54] HOT AIR TOOL FOR HEAT-SHRINK TUBING

[76] Inventor: James D. Rose, 1626 Becky Ct., Santa Rosa, Calif. 95403

[21] Appl. No.: 365,550

[22] Filed: Dec. 28, 1994

[51] Int. Cl.$^6$ ........................................................ F24J 3/00
[52] U.S. Cl. .......................... 126/401; 126/406; 431/253; 431/344; 432/225
[58] Field of Search .................... 126/401, 402, 126/406–414, 226, 229, 231; 432/225, 226, 183; 431/253, 350, 344; 34/90, 96, 97, 98

[56] References Cited

U.S. PATENT DOCUMENTS

| | | | |
|---|---|---|---|
| 3,816,065 | 6/1974 | Marietta | 432/226 |
| 3,845,755 | 11/1974 | Aske | 126/401 |
| 4,176,657 | 12/1979 | Eriksson et al. | 126/401 |
| 4,449,925 | 5/1984 | Williams et al. | 126/413 |
| 5,178,535 | 1/1993 | Delalle | 431/350 |

*Primary Examiner*—James C. Yeung
*Attorney, Agent, or Firm*—Larry D. Johnson

[57] ABSTRACT

A hot-air generating tool for use with heat-shrink tubing in electrical wiring applications device includes a heat source such as a disposable butane lighter, a body member having a top portion and a bottom portion, the bottom portion adapted for releasable capture of the heat source, and the top portion including an exhaust nozzle oriented over the heat source and adapted to direct a stream of air over the heat source. A heat reflector member is connected to the body member by a reflector arm and is adapted to deflect the heated air stream from the heat source and exhaust nozzle to a target area. A mouth piece member is connected to the exhaust nozzle by a length of tubing, so that when a user ignites the heat source and delivers a stream of air through the mouth piece, the air is delivered through the exhaust nozzle, over the heat source, and towards the target area.

6 Claims, 2 Drawing Sheets

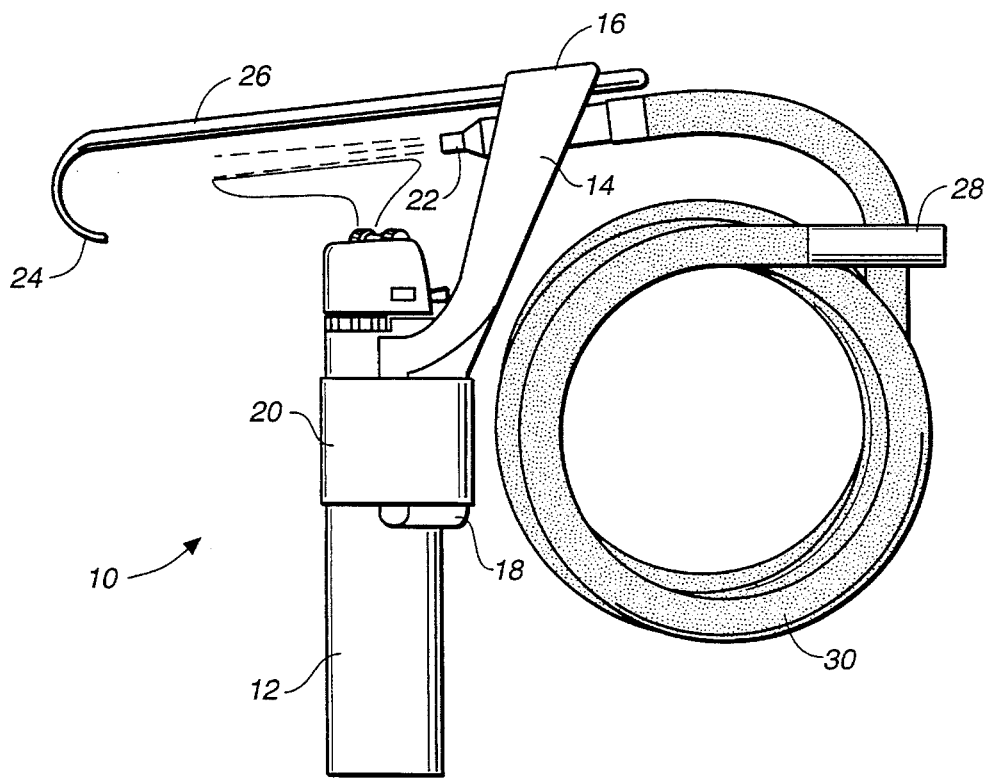
FIG._1
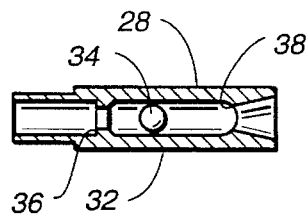
FIG._1A
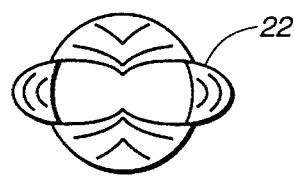
FIG._2A
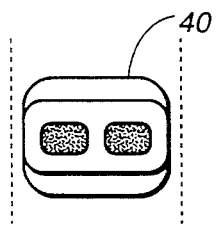
FIG._2B

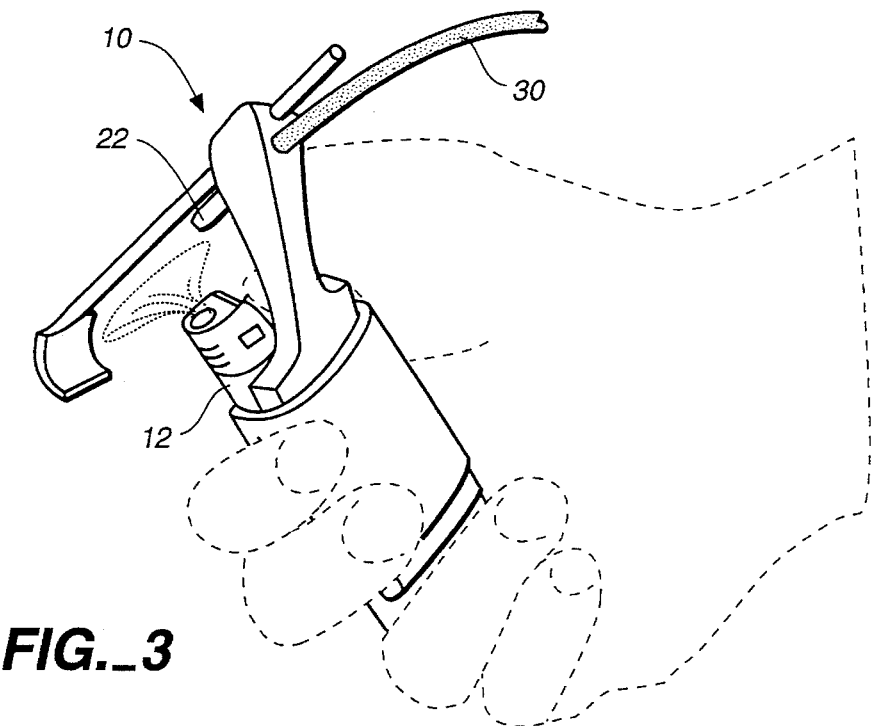
FIG._3
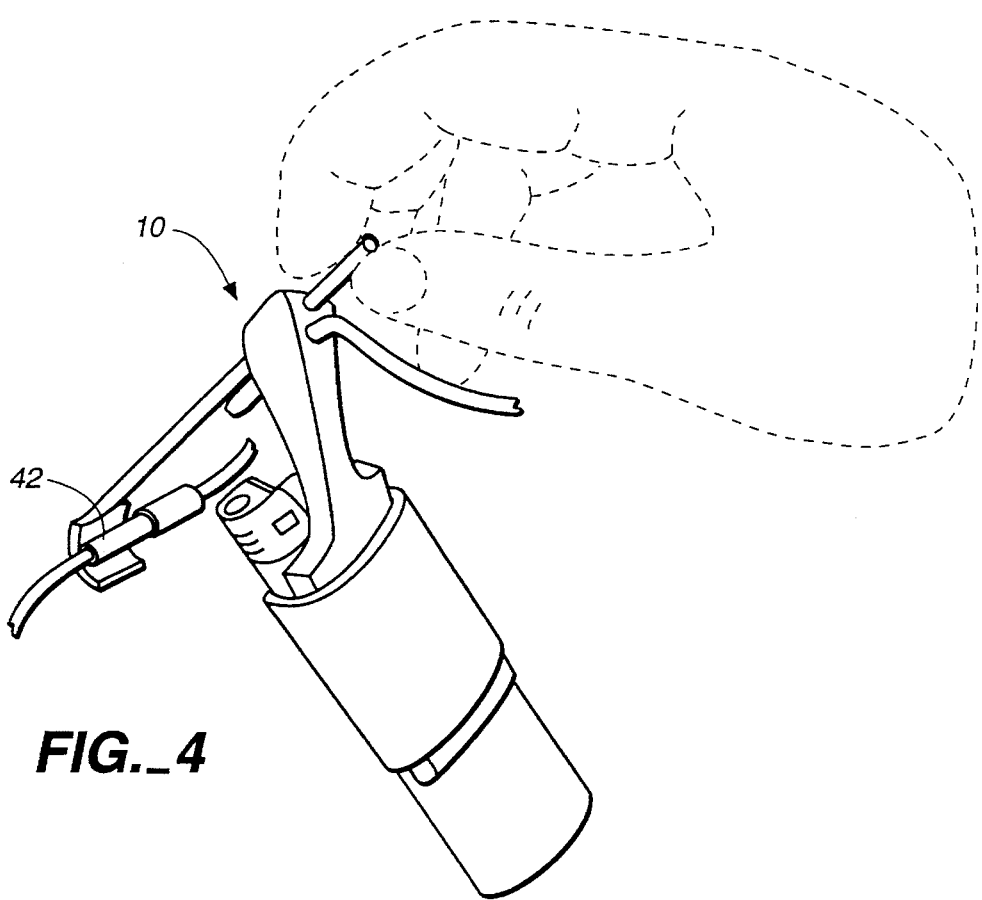
FIG._4

5,476,089

HOT AIR TOOL FOR HEAT-SHRINK TUBING

BACKGROUND OF THE INVENTION

1. Field of the Invention

This invention relates generally to tools and hardware, and more specifically to an improved hot air tool device for use with heat-shrink tubing in electrical wiring applications.

2. Description of the Prior Art

Many electrical wiring applications utilize short segments of heat-shrink tubing to cover and shield the electrical connections. Typically, the segment of heat-shrink tubing is placed over the electrical connection of interest, and a stream of hot air is directed against the tubing, causing it to shrink against the connection. Unfortunately, the tools used to generate this stream of hot air are often large, expensive, and unwieldy to use.

Since commercially available heat-guns are often expensive and bulky, some operators simply use a lighter, which has the inherent drawbacks of easily burning the heat-shrink tubing and nearby insulation, even if it is possible to get the flame under the tubing to be heated. Soldering irons and other hot-tip devices also don't work well, for they take far too much time, and require getting so close to the tubing that the tubing is often burned.

SUMMARY OF THE INVENTION

The hot air tool of this invention provides a simple hot-air generating tool for use with heat-shrink tubing in electrical wiring applications. The inventive device includes a heat source such as a disposable butane lighter, a body member having a top portion and a bottom portion, the bottom portion including strap means for releasable capture of the heat source, and the top portion including an exhaust nozzle oriented over the heat source and adapted to direct a structured stream of air over the heat source. A heat reflector member is connected to the body member by a reflector arm and is adapted to deflect the heated air stream from the heat source and exhaust nozzle to a target area. A mouth piece member is connected to the exhaust nozzle by a length of tubing, so that when a user ignites the heat source and exhales (or otherwise delivers a stream of air such as by an air pump, powered air-supply source, or pressurized tank) through the mouth piece, a stream of air is delivered through the exhaust nozzle, over the heat source, and towards the target area.

The unique features of this device include its compact size, essentially instantaneous achievement of operating temperature, quick cool-down, simple and inexpensive construction and operation, and the ability to be configured with many different options and packages.

There are many advantages of this device over the standard, full-size hot-air gun. The small size is optimum for carrying in a tool kit, making it the perfect portable for on-site electronic repairs. The butane power supply makes it useful where electricity is absent. Though the air volume is small and not suited for constant work, it is entirely adequate for repair work and light assembly using large or small diameter heat-shrink tubing. The consumption of butane gas is minimal, turning completely off when not in use. Its simplicity and low cost make it affordable for every technician who works with heat-shrink tubing, which is universally used in the electronics industry.

The advantages over the use of just the flame from the lighter is that this device will not melt or burn the heat-shrink tubing, even though it will heat it quickly to the temperature necessary to cause it to shrink. Also, the heated air can be precisely aimed, and will not harm the insulation of nearby wires.

The butane source is widely available as disposable lighters. Alternatively, for increased flame control and lower cost, a quality refillable lighter is recommended.

Another advantage is that it is convenient and easy to use. The inventive design allows holding the lighter in the most common and natural position, with the thumb on the lighter's striker. It uses very little room on the workbench next to a soldering iron, and rests in a position ready to be quickly grasped. With the right hand already in the striking position the device is maneuvered into place. Then, with the left hand, place the mouthpiece to your mouth, and gently exhale and strike the lighter. It takes about three seconds to position.

The inventive device is also efficient both in application and fuel use. To shrink a ¾" piece of ⅛" diameter heat shrink tubing takes less than five seconds of heat. The same length of ¼" diameter tubing takes less than 10 seconds, even for higher temperature heat shrink tubing. In both cases, this is the time required to shrink even the back side of the tubing with the use of the reflector, since the front or flame side of the tubing shrinks almost instantly. There is no waiting for the warm-up period of an electric heat gun. The cool-down of the device is almost as quick, for the only part that gets hot to the touch is the reflector, and this cools so quickly that the reflector arm connecting the reflector to the body of the device doesn't even get hot where it touches the body.

Since each normal application only lasts from five to ten seconds, very little fuel is used each time. This means hundreds of uses from a single disposable lighter, even though the optimum "unblown" flame size is one and one-quarter inches tall ("unblown" refers to a flame that has no air stream intercepting it).

Further efficiency of fuel use and heat transfer is afforded by use of the structured parallel air-stream injector nozzle. With just a round or flared end on the exhaust tube, most of the flame will not be carried to the heat-shrink tubing due to air-pressure dynamics that generally repel the flame away from the high-pressure air stream. If the flame and the airstream are both horizontal, much of the flame curves upward out of the airstream. This problem was solved by adding the structured parallel air-stream design to the end of the injector nozzle. This causes the airstream to actually be two or more high-pressure, parallel airstreams with a low-pressure zone in between them. This low-pressure zone effectively draws the flame into this zone, even around the high-pressure streams, such that the entire flame is directed or drawn into the full airstream, no matter what the flame or airstream orientation is. This insures that all of the flame's heat is carried to the heat-shrink tubing while adding more oxygen to the flame, resulting in a blue-hot flame that is soot free.

This flame size and length of time lit are well within the limits of safe use for these lighters. Some disposable lighters include a warning label on the side of their lighters suggesting thirty seconds as the maximum safe continuous lit period. The flame-adjustment feature of some disposable lighters allow much larger flames to be set, and yet when properly used, the inventive device never allows the flame to get larger than one-half of an inch tall, for this is where the air-stream intercepts it.

A further safety feature is the one-way valve/mouthpiece.

This feature prevents any inhaling by the user through the device, yet introduces no resistance to exhaling through the device. However, even without the safety valve, an inhale is no more severe to the user than inhaling through a long pipe stem.

BRIEF DESCRIPTION OF THE DRAWINGS

FIG. 1 is a side elevation view of this invention, illustrating its component parts including a heat source such as a disposable butane lighter, a body member having a top portion and a bottom portion, the bottom portion including strap means for releasable capture of the heat source, the top portion including an exhaust nozzle oriented over the heat source and adapted to direct a structured stream of air over the heat source, a heat reflector member connected to the body member by a reflector arm and adapted to deflect the heated air stream from the heat source and exhaust nozzle to a target area, and a mouth piece member connected to the exhaust nozzle by a length of tubing, wherein when a user ignites the heat source and exhales (or otherwise delivers a stream of air) through the mouth piece, a stream of air is delivered through the exhaust nozzle, over the heat source, and towards the target area;

FIG. 1a is a side elevation cross-sectional view of the mouthpiece member of FIG. 1, illustrating an internal one-way valve consisting of a movable ball adapted to seat against a medial stop element to permit exhalation (downstream flow), and seal against a proximal seat element to prevent inhalation (upstream flow);

FIG. 2a is a front view of the exhaust nozzle of FIG. 1 illustrating its structured parallel-airstream design;

FIG. 2b is a front view of an alternate twin-outlet embodiment of an exhaust nozzle;

FIG. 3 is a perspective view of a user holding the hot air tool of this invention igniting the heat source, and exhaling through the tubing and exhaust nozzle; and FIG. 4 is a perspective view of the hot air tool of this invention in operation to direct a stream of hot air onto a segment of heat-shrink tubing to seal an electrical connection, though not held as in actual use.

DETAILED DESCRIPTION OF A PREFERRED EMBODIMENT

FIG. 1 is a side elevation view of a hot air tool 10 for heat-shrink tubing of this invention, illustrating its component parts including a heat source 12 such as a disposable butane lighter, a body member 14 made of polypropylene, ABS or other high-density plastic having a top portion 16 and a bottom portion 18, the bottom portion including a strap 20 for releasable capture of the heat source 12. The strap may be a Velcro, elastic, or other adjustable band, or any other releasable fastener to capture the heat source. The top portion 16 includes an exhaust nozzle 22 such as a pinched, twin-fluted tubing segment oriented over the heat source 12 and adapted to direct a stream of air over the heat source (and preferably, multiple parallel streams of air). A heat reflector member 24 is connected to the body member 14 by a reflector arm 26 and is adapted to deflect the heated air stream from the heat source and exhaust nozzle to a target area T. A mouth piece member 28 is connected to the exhaust nozzle 22 by a length of recoiling plastic tubing 30.

FIG. 1a is a side elevation cross-sectional view of the mouthpiece member 28 of FIG. 1, illustrating an internal one-way valve 32 consisting of a movable ball 34 adapted to seat against a medial stop element 36 to permit exhalation (downstream flow), and seal against a proximal seat element 38 to prevent inhalation (upstream flow). Alternatively, other designs may be utilized to achieve the desired one-way valve feature.

FIG. 2a is a front view of the exhaust nozzle 22 of FIG. 1 illustrating a pinched twin-fluted design; while FIG. 2b illustrates a twin-outlet exhaust nozzle 40. These views illustrate the structured parallel airstream design of the exhaust nozzle. As described supra, this causes the airstream to actually be two high-pressure, parallel airstreams with a low-pressure zone in between them. This low-pressure zone effectively draws the flame into this zone, even around the high-pressure streams, such that the entire flame is drawn into the full airstream, no matter what the flame or airstream orientation is. This insures that all of the flame's heat is carried to the heat-shrink tubing while adding more oxygen to the flame, resulting in a blue-hot flame that is soot free.

FIG. 3 is a perspective view of a user holding the hot air tool 10 of this invention igniting the heat source 12, and exhaling through the tubing 30 and exhaust nozzle 22.

FIG. 4 is a perspective view of the hot air tool 10 of this invention in operation (though not being held as in actual use) to direct a stream of hot air onto a segment of heat-shrink tubing 42 to seal an electrical connection.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. A hot air tool for use with heat-shrink tubing in electrical wiring applications, said hot air tool comprising:

a heat source;

a body member having a top portion and a bottom portion, said bottom portion including capture means for releasable capture of said heat source, and said top portion including a nozzle oriented over said heat source and adapted to direct a stream of air over said heat source;

a heat reflector member connected to said body member by a reflector arm and adapted to deflect the heated air stream from said heat source and nozzle to a target area; and a mouth piece member connected to said nozzle by a length of tubing, wherein when a user ignites said heat source and delivers a stream of air through said mouth piece, the stream of air is delivered through said nozzle, over said heat source, and towards said target area.

2. The hot air tool of claim 1 wherein said nozzle comprises a pinched, twin-fluted tubing segment oriented over the heat source and adapted to direct multiple parallel streams of air over the heat source.

3. The hot air tool of claim 1 wherein said nozzle comprises a twin-outlet exhaust nozzle oriented over the heat source and adapted to direct multiple parallel streams of air over the heat source.

4. The hot air tool of claim 1 wherein said mouth piece member includes a one-way valve.

5. The hot air tool of claim 1 wherein said heat source comprises a butane lighter.

6. The hot air tool of claim 1 wherein said heat source capture means comprises a strap.

* * * * *